(No Model.)
G. A. MANGUM.
MUD SCRAPER.
No. 429,217. Patented June 3, 1890.
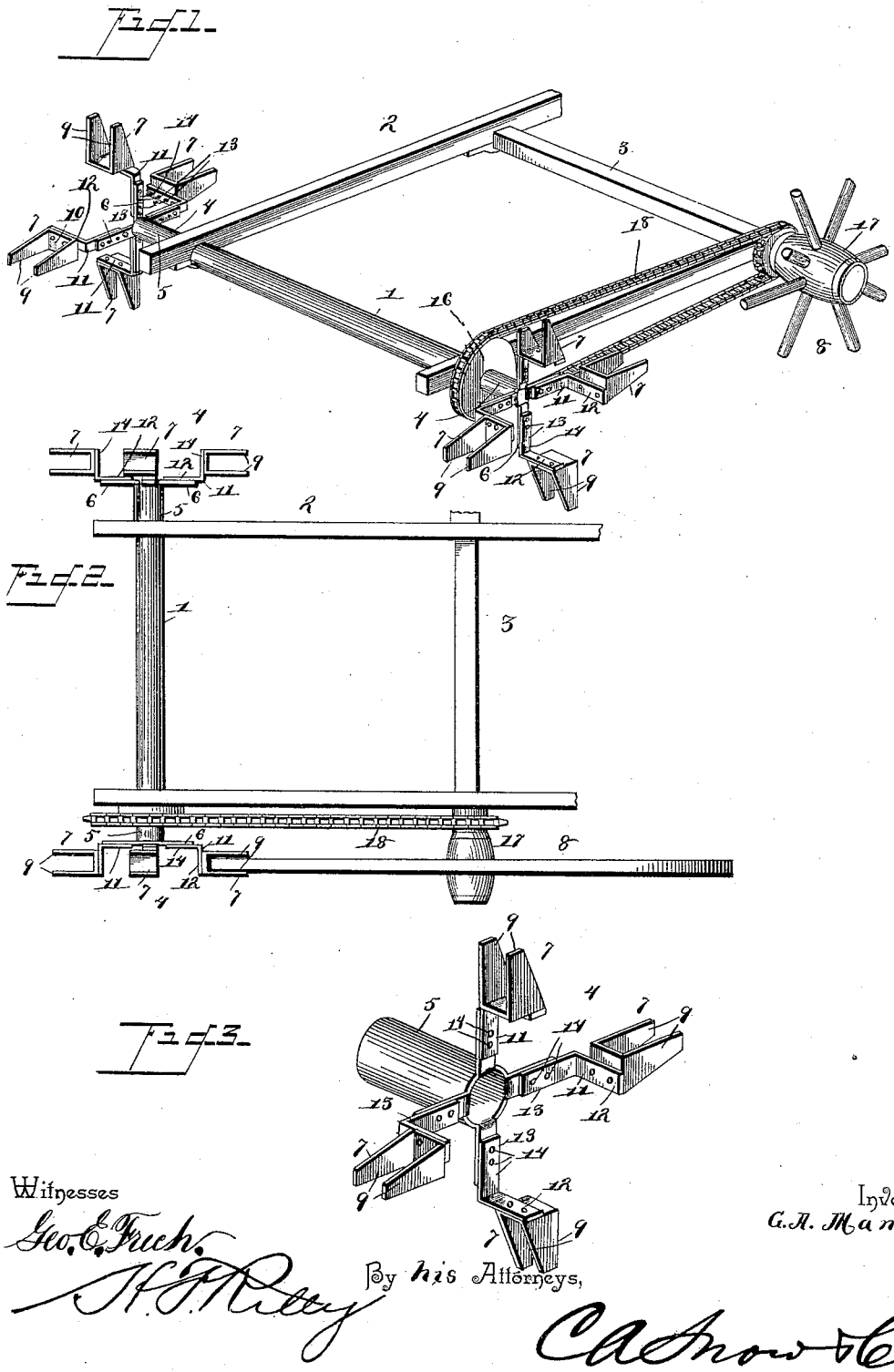
Witnesses
Geo. E. Fuch.
H. J. Riley
Inventor
G. A. Mangum
By his Attorneys,
C. A. Snow & Co.

UNITED STATES PATENT OFFICE.

GEORGE A. MANGUM, OF SKIDMORE, TEXAS.

MUD-SCRAPER.

SPECIFICATION forming part of Letters Patent No. 429,217, dated June 3, 1890.

Application filed April 9, 1890. Serial No. 347,173. (No model.)

*To all whom it may concern:*

Be it known that I, GEORGE A. MANGUM, a citizen of the United States, residing at Skidmore, in the county of Bee and State of Texas, have invented a new and useful Mud-Scraper, of which the following is a specification.

The invention relates to improvements in mud-scrapers.

The object of the invention is to provide a device adapted to be readily attached to a vehicle and arranged adjacent to the wheels to scrape the mud therefrom.

A further object of the invention is to provide a device adapted to be adjusted to various vehicles to bring its scrapers in proper position relative to the wheel.

The invention consists in the construction and novel combination and arrangement of parts hereinafter fully described, illustrated in the accompanying drawings, and pointed out in the claims hereto appended.

In the drawings, Figure 1 is a perspective view of a running-gear provided with a device constructed in accordance with this invention. Fig. 2 is a plan view. Fig. 3 is a detail perspective view of one of the spiders and the adjustable scrapers.

Referring to the accompanying drawings, 1 designates a transverse shaft, which is journaled in a frame 2, that connects the transverse shaft to the axle of the vehicle, and the said frame and shaft are supported by suitable stays and braces. The transverse shaft 1 is arranged in the rear of the axle 3, and is provided at its ends with a pair of spiders 4, that consist of a sleeve portion 5 and arms 6, extending radially from the sleeve 5 and adapted to be adjustably connected to the scrapers 7, that straddle the wheel 8 and scrape the mud therefrom. The scrapers 7 are constructed of suitable material, preferably sheet metal, and are approximately U-shaped and have their sides 9 connected with the back portion 10 by a sharp angle, and they are secured to L-shaped plates or knees 11, that have one arm 12 fastened to the back of the scraper, and the other arm 13 is provided with a series of perforations 14, that register with similar perforations 15 of the arms 6 of the spider 4, and the said arm 13 is connected to the spider by bolts and is adapted to be adjusted to bring the scrapers in proper relative position to the wheel. The shaft 1 has mounted thereon a sprocket-wheel 16, that is connected with the hub 17 of one of the wheels 8 by a sprocket-chain 18, which transmits motion to the transverse shaft 1 and rotates the scrapers, which remove the mud from the wheels.

From the foregoing it will readily be seen that the scraper is simple and inexpensive in construction, adapted to be readily connected to and operated by a vehicle, and is capable of adjustment to bring its scrapers in proper position relative to the wheel to remove mud from the latter.

The device is especially advantageous in portions of the country where roads are bad and vehicle travel is impossible in wet weather.

Having thus described my invention, I claim—

1. A mud-scraper comprising the rotating scrapers adapted to be arranged adjacent to the wheels of a vehicle and be operated thereby, substantially as and for the purpose described.

2. The combination, with a vehicle, of the transverse shaft geared to one of the wheels and provided with rotating scrapers arranged adjacent to the wheels, substantially as described.

3. The combination, with a vehicle, of the transverse shaft geared to one of the wheels and provided at its ends with spiders, and the scrapers adjustably connected to the spiders and arranged adjacent to a wheel, substantially as described.

4. The combination, with a vehicle, of the transverse shaft geared to one of the wheels and provided at its ends with spiders, and the approximately U-shaped scrapers straddling the wheel, substantially as described.

5. The combination, with a vehicle, of the transverse shaft geared to one of the wheels and provided at one of its ends with spiders, having its arms provided with perforations, the approximately U-shaped scrapers arranged to straddle the wheel, and the L-shaped plates or knees having one arm secured to a scraper and the other arm provided with perforations adjustably connected to the spider, substantially as described.

In testimony that I claim the foregoing as my own I have hereto affixed my signature in presence of two witnesses.

GEORGE A. MANGUM.

Witnesses:
T. E. VAUGHN,
J. L. VAUGHN.